(No Model.) 2 Sheets—Sheet 1.
J. IMLAH.
UNICYCLE.
No. 480,585. Patented Aug. 9, 1892.
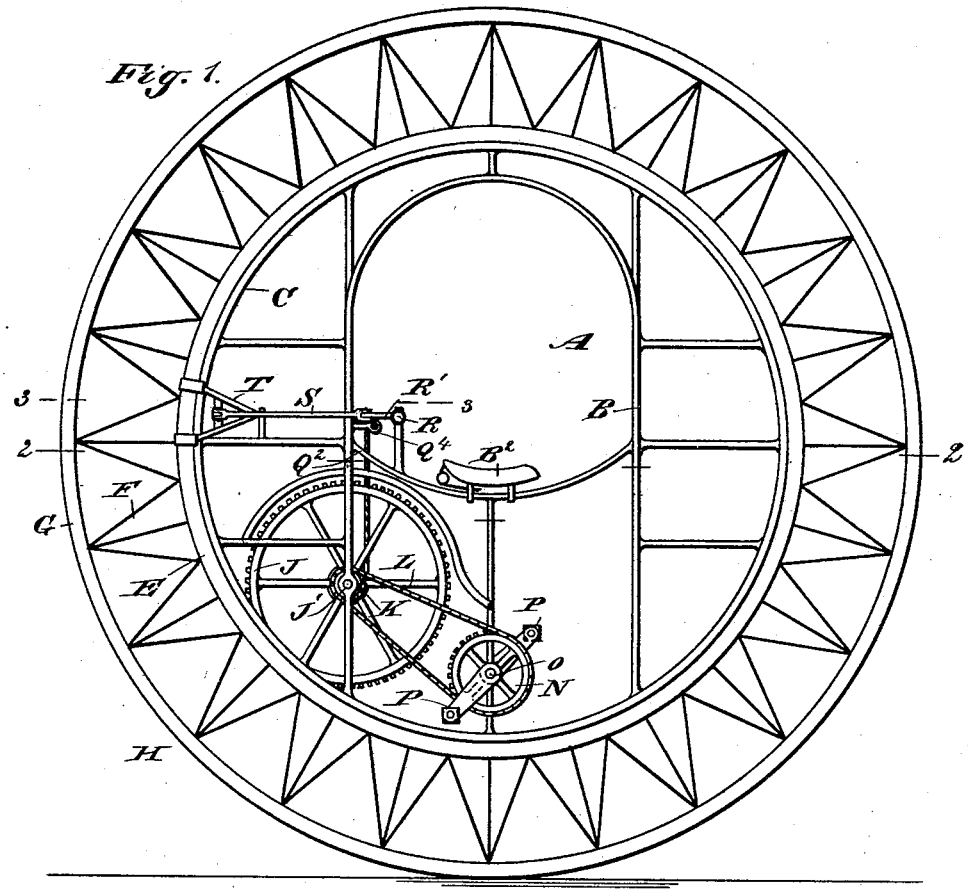
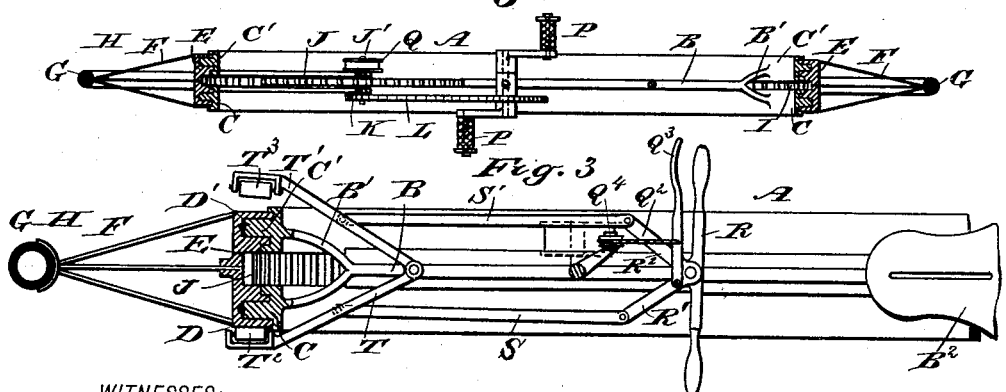
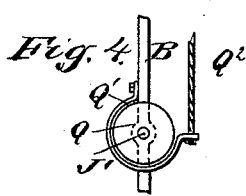
WITNESSES:
J. A. Bergstrom
C. Sedgwick
INVENTOR:
J. Imlah
BY Munn & Co
ATTORNEYS.

(No Model.) 2 Sheets—Sheet 2.

J. IMLAH.
UNICYCLE.

No. 480,585. Patented Aug. 9, 1892.

WITNESSES:
J. A. Bergstrom
C. Sedgwick

INVENTOR:
J. Imlah
BY Munn & Co.
ATTORNEYS.

UNITED STATES PATENT OFFICE.

JAMES IMLAH, OF BARRE, VERMONT.

UNICYCLE.

SPECIFICATION forming part of Letters Patent No. 480,585, dated August 9, 1892.

Application filed February 26, 1892. Serial No. 422,907. (No model.)

*To all whom it may concern:*

Be it known that I, JAMES IMLAH, of Barre, in the county of Washington and State of Vermont, have invented a new and Improved Unicycle, of which the following is a full, clear, and exact description.

The object of the invention is to provide a new and improved unicycle which is simple and durable in construction and easily manipulated both for steering and propelling purposes.

The invention consists in the construction and combination of parts hereinafter described and claimed.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 5:
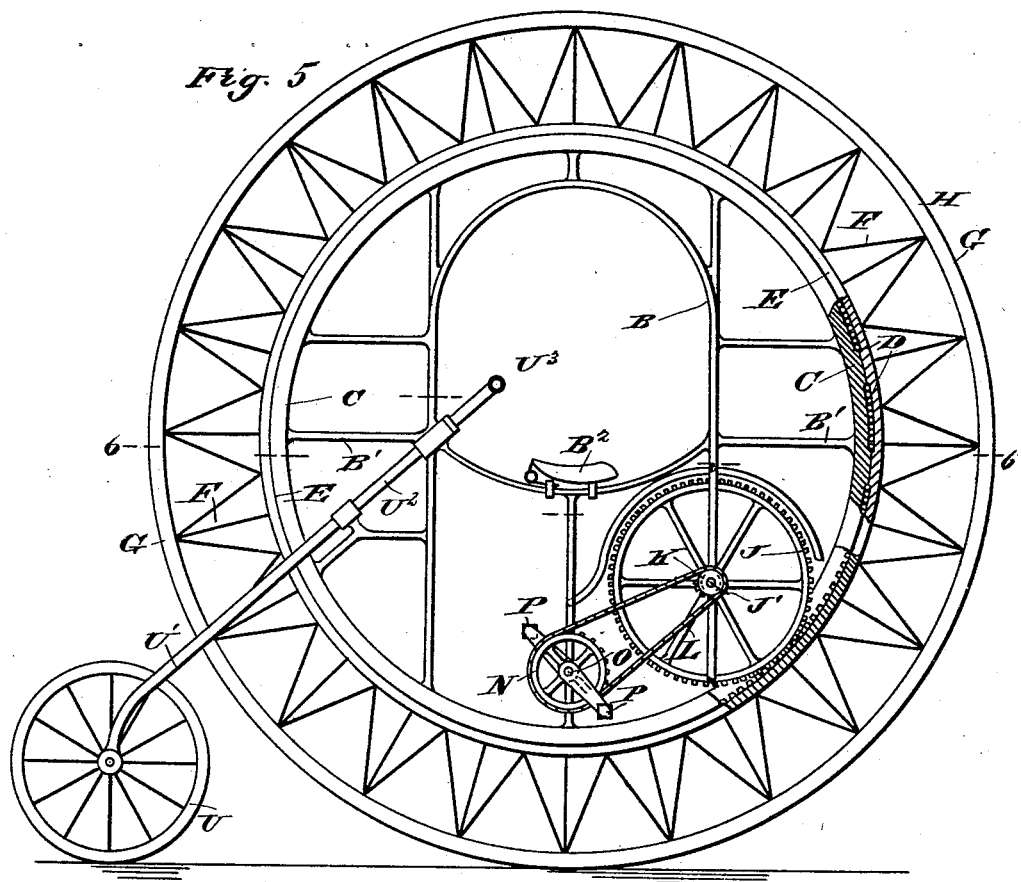
Figure 6:
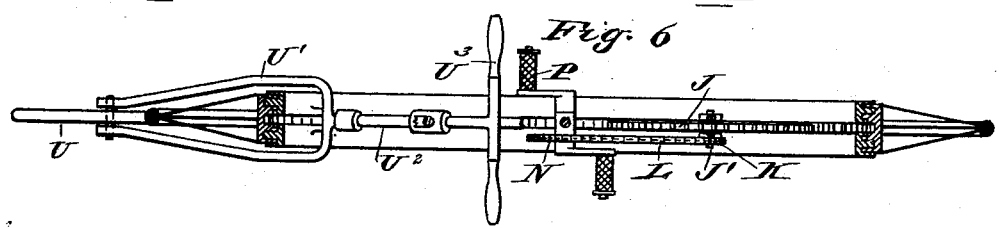
Figure 7:
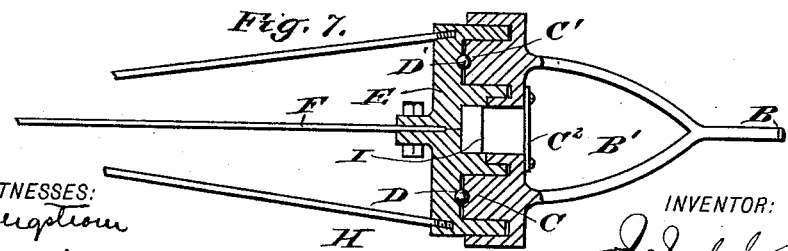

Figure 1 is a side elevation of the improvement. Fig. 2 is a sectional plan view of the same on the line 2 2 of Fig. 1. Fig. 3 is an enlarged sectional plan view of part of the improvement on the line 3 3 of Fig. 1. Fig. 4 is an enlarged side elevation of part of the brake mechanism. Fig. 5 is a side elevation, with parts in section, of a modified form of the improvement. Fig. 6 is a sectional plan view of the same on the line 6 6 of Fig. 5. Fig. 7 is an enlarged sectional plan view showing the connection between the rim of the exterior wheel and the inner wheel.

The improved unicycle is provided with an inner wheel A, formed with a suitable framework B, and a double rim C C', connected with the forked ends B' of the framework B. The two rim parts C and C' engage ball-bearings D and D', respectively, formed in an inner annular flange E, connected by spokes F with the tire G of the exterior wheel H. By this arrangement the outer wheel H can travel with its tire G on the ground, while the inner wheel A rolls off on the annular flange E, so that the rider seated on the seat $B^2$ in the framework B holds the latter in a normal position, so that the inner wheel does not rotate.

In order to impart motion to the exterior wheel by the exertions of the rider seated on the seat $B^2$, the following device is provided: Between the two annular ball-bearings D and D' is arranged in the rim E an internal gear I in mesh with a gear-wheel J, secured on a shaft J', extending transversely and mounted to turn in suitable bearings in the framework B. On this shaft J' is secured a sprocket-wheel K, over which passes a sprocket-chain L, also passing over a sprocket-wheel N, secured on a shaft O, extending transversely and mounted to turn in suitable bearings directly below the seat $B^2$ of the rider. On the ends of the shaft O are secured the usual treadles P, extending in opposite directions and engaged by the feet of the rider, so that by the exertion of the latter a rotary motion is imparted to the shaft O. The movement of the latter is transmitted by the sprocket-wheel N, chain L, and sprocket-wheel K to the shaft J', carrying the large gear-wheel J, and as the latter is rotated and meshes in the gear I a rotary motion is given to the exterior wheel H.

In order to brake the unicycle, a brake-wheel Q is fastened on the shaft J' and is engaged by a brake-band Q', fastened by one end to the framework B, and after encircling part of the brake-wheel Q is connected at its front end with a rope $Q^2$, extending vertically and connected at its upper end with a brake-lever $Q^3$, pivoted on the steering-lever R. The rope $Q^2$ also passes over a friction-roller $Q^4$, so as to properly guide the rope. When the lever $Q^3$ is pressed, a pull is exerted on the rope $Q^2$, so that the brake-band Q' is drawn with more or less force into frictional contact with the brake-wheel Q, thus braking the shaft J', and consequently the entire machine.

The steering-lever R is arranged in front of the rider's seat $B^2$ and is pivoted to the framework B and arranged to swing horizontally. The steering-lever R is provided with two arms R' and $R^2$, extending forward and pivotally connected by links S and S', respectively, with arms T and T', respectively pivoted on a common pivot arranged in the framework B. The free ends of the arms T and T' extend to the sides of the rim E, and in the free ends are journaled friction-rollers $T^2$ and $T^3$, respectively, adapted to engage the opposite edges of the rim E, as will be plainly understood by reference to Fig. 3. When the lever R is in a normal position, the friction-rollers T² and T³ are out of contact with the edges of the rim E, but when the lever R is turned one of the arms T or T' swings with its friction-roller T² or T³, respectively, inward into contact with the edge of the rim E, thus exerting a pressure on the said rim, so that the direction of the entire unicycle will be changed. For instance, if the wheel T² is pressed against the left side of the rim E, then the unicycle will turn to the right, and by pushing the lever R in an opposite direction, so that the other friction-roller T³ presses on the right-hand side of the rim E, then the unicycle will turn to the left.

Instead of the steering mechanism described, the steering mechanism illustrated in Figs. 5 and 6 can be employed, this steering mechanism consisting of a wheel U, journaled in the forked end U' of a shaft U², mounted to turn in suitable bearings in the framework B. On the inner end of the shaft U² is arranged a handle U³ within convenient reach of the operator seated on the seat B², so that when the handle U³ is turned the steering-wheel U will guide the unicycle either to the right or left, according to the direction in which the handle U³ is turned.

The space between the double rim C C' can be covered by a suitable cover C², with the exception of that part through which passes the wheel J.

It will be seen that a unicycle arranged in this manner is very simple and durable in construction, can be readily manipulated both for steering and propelling purposes, and at the same time enabling the rider to impart a high rate of speed to the wheel.

Having thus described my invention, I claim as new and desire to secure by Letters Patent—

1. A unicycle comprising an inner wheel having a double rim and a framework carrying the seat, an exterior wheel formed with an annular flange connected by spokes with a tire, ball-bearings arranged in the said annular flange and engaged by the double rim of the inner wheel, and a propelling mechanism supported in the said framework and provided with a large gear-wheel in mesh with an internal gear on the said rim, substantially as shown and described.

2. A unicycle comprising an inner wheel having a double rim and a framework carrying the seat, an exterior wheel formed with an annular flange connected by spokes with a tire, ball-bearings arranged in the said annular flange and engaged by the double rim of the inner wheel, a propelling mechanism supported in the said framework and provided with a large gear-wheel in mesh with an internal gear on the said rim, and a treadle mechanism adapted to be actuated by the rider seated on the said seat and connected with the said large gear-wheel, substantially as shown and described.

3. A unicycle comprising an inner wheel having a double rim and a framework carrying the seat, an exterior wheel formed with an annular flange connected by spokes with a tire, ball-bearings arranged in the said annular flange and engaged by the double rim of the inner wheel, a propelling mechanism supported in the said framework and provided with a large gear-wheel in mesh with an internal gear on the said rim, and a brake mechanism under control of the operator, substantially as shown and described.

4. A unicycle comprising an inner wheel having a double rim and a framework carrying the seat, an exterior wheel formed with an annular flange connected by spokes with a tire, ball-bearings arranged in the said annular flange and engaged by the double rim of the inner wheel, a propelling mechanism supported in the said framework and provided with a large gear-wheel in mesh with an internal gear on the said rim, and a steering mechanism, substantially as described.

JAMES IMLAH.

Witnesses:
GEORGE PATTERSON,
WILLIAM A. MOIR.